No. 616,121. Patented Dec. 20, 1898.
P. LENIHAN.
ARMORED PNEUMATIC TIRE FOR BICYCLES.
(Application filed Mar. 16, 1898.)
(No Model.)
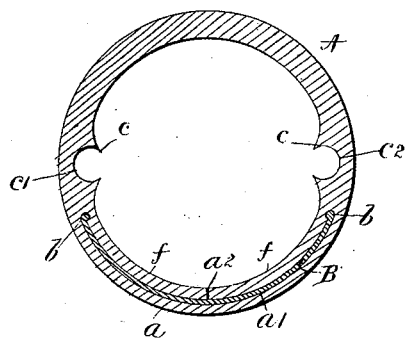
WITNESSES
John Ruckter,
Carrie C Olsen
INVENTOR
Patrick Lenihan
BY
Edgar Tate
ATTORNEYS

UNITED STATES PATENT OFFICE.

PATRICK LENIHAN, OF NEW YORK, N. Y.

ARMORED PNEUMATIC TIRE FOR BICYCLES.

SPECIFICATION forming part of Letters Patent No. 616,121, dated December 20, 1898.

Application filed March 16, 1898. Serial No. 674,098. (No model.)

*To all whom it may concern:*

Be it known that I, PATRICK LENIHAN, a citizen of the United States, residing at New York, in the county of New York and State of New York, have invented certain new and useful Improvements in Armored Pneumatic Tires for Bicycles and Similar Vehicles, of which the following is a full and complete specification, such as will enable those skilled in the art to which it appertains to make and use the same.

This invention relates to armored pneumatic tires for bicycles and other vehicles; and it has for its object to provide a simple and improved tire of this character which will be proof against punctures and which will be durable and effective in operation.

The invention is fully disclosed in the following specification, of which the accompanying drawing forms a part, in which the separate parts of my improvement are designated by letters of reference, said drawing being a transverse section of a tire made according to my invention.

Referring to the drawing, A designates the tire, which is of the usual tubular or cylindrical form and is constructed of rubber or other analogous material and adapted to be inflated in the customary manner. In the tread portion $a$ of the tire is inserted or embedded a plate B, which is preferably formed of aluminium or other metal and extends longitudinally with respect to the tire. This plate is segmentally curved in transverse section, so that it corresponds to the sectional contour of the tread portion of the tire and is preferably about centrally located within the body of the wall of the tire, as shown. The plate may be provided with longitudinal curved or rounded ridges or heads $b$ at its respective ends, which operate, with respect to the surrounding substances of the tire-body, to retain and brace the plate in position.

In practice the plate B may be molded within the tire in the process of manufacturing the latter, in which case the relative construction and arrangement will be substantially that shown in the drawing. The plate B may, however, be inserted in position within a corresponding slot or recess $a'$ formed in the wall of the tire, the inner face of said wall of the tire being longitudinally slitted with respect to the slit or recess $a'$, as shown at $a^2$, to form flap portions, as at $f$, which may be turned upwardly in the process of manufacturing the tire and before the same is sealed or cemented to provide for the convenient insertion of the plate B.

The operation and advantages of my invention will be readily understood. The inserted segmental plate B is so inclosed within the wall of the tire that it will form an effective armor against punctures and will at the same time serve as a bracing or stiffening means, by which the strength and resilient action of the tire will be materially enhanced. The construction and arrangement is such that the tire and armor-plate correspondingly move in the variable positions which may be assumed or caused by pressure during the operation of the tire.

The tire is also interiorly provided with an enlarged ridge or portion, as at $c$, extending longitudinally and about centrally at opposite sides, as shown, the base portion of which ridge or enlargement has a relative position by which it bears with respect to the terminal ends of the armor-plate B in the compression of the tire, a thickened portion being thus provided to meet the strain caused by the bearing of said ends. In said ridges or enlarged portions $c$ is also provided a continuous groove or recess $c'$, which forms a thin or narrow central wall or portion, as at $c^2$, at each side the tire and intermediately between its tread and base portions, which reduced or narrow portion operates to enhance the elastic office or function of the tire in its operation and provides in this respect for a full and effective elastic action, notwithstanding the stiffened and strengthened characteristics of the armored tread portion.

Having fully described my invention, I claim as new and desire to secure by Letters Patent—

1. An improved elastic pneumatic tire of the class described, consisting of a tube forming the air-chamber and having grooves or recesses in its side walls arranged intermediately between the walls forming the tread and base portions and in a longitudinal direction, said grooves forming a narrow or thin side wall portion intermediately between the tread and base portions of the tire, substantially as and for the purpose set forth.

2. An improved elastic pneumatic tire of the class described, consisting of a tube forming the air-chamber and having interior ridges or enlarged portions at its opposite sides projecting into the air-chamber and arranged intermediately with respect to the tread and base portions and extending in a longitudinal direction, said ridges or enlarged portions being provided with a longitudinal groove or recess forming a thin or narrow side portion intermediately between the tread and base portions of the tire, substantially as and for the purpose set forth.

3. An improved elastic pneumatic tire of the class described, consisting of a tube forming the air-chamber and having an armor-plate inserted or embedded in its tread portion and provided intermediately between said armored tread portion and its base portion with grooves or recesses forming a reduced and thin or narrow side portion at opposite sides, substantially as and for the purpose set forth.

4. An improved elastic pneumatic tire of the class described, consisting of a tube forming the air-chamber and having an armor-plate inserted or embedded within the tread portion of said tube, the tube being provided with interior ridges or enlarged portions at its opposite sides projecting into the air-chamber and arranged intermediately with respect to the tread and base portions and extending in a longitudinal direction, the enlargements being at a point above the terminal ends of said embedded armor-plate and having grooves or recesses formed therein, substantially as and for the purpose set forth.

5. An improved elastic pneumatic tire of the class described, consisting of a tube forming the air-chamber and provided with an armor-plate inserted or embedded within the tread portion, said armor-plate having at its respective end edges longitudinal beads forming rounded retaining-heads, the tube being interiorly provided with ridges or enlarged portions at opposite sides projecting into the air-chamber and arranged intermediately with relation to the tread and base portions and extending in a longitudinal direction at a point above the terminal rounded beaded heads of the armor-plate, grooves or recesses being formed in said ridges or enlarged portions, substantially as and for the purpose set forth.

In testimony that I claim the foregoing as my invention I have signed my name, in presence of the subscribing witnesses, this 15th day of March, 1898.

PATRICK LENIHAN.

Witnesses:
L. M. MULLER,
M. A. KNOWLES.